Oct. 6, 1931.  P. C. RUMMEL, JR  1,826,482
POWER STOP MECHANISM
Filed April 24, 1929    3 Sheets-Sheet 1
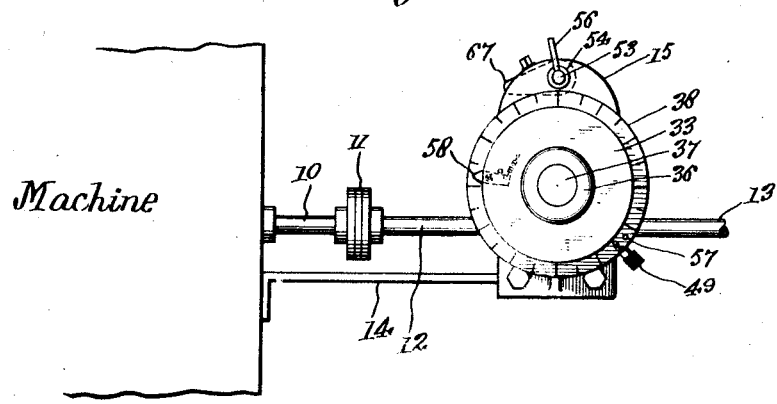
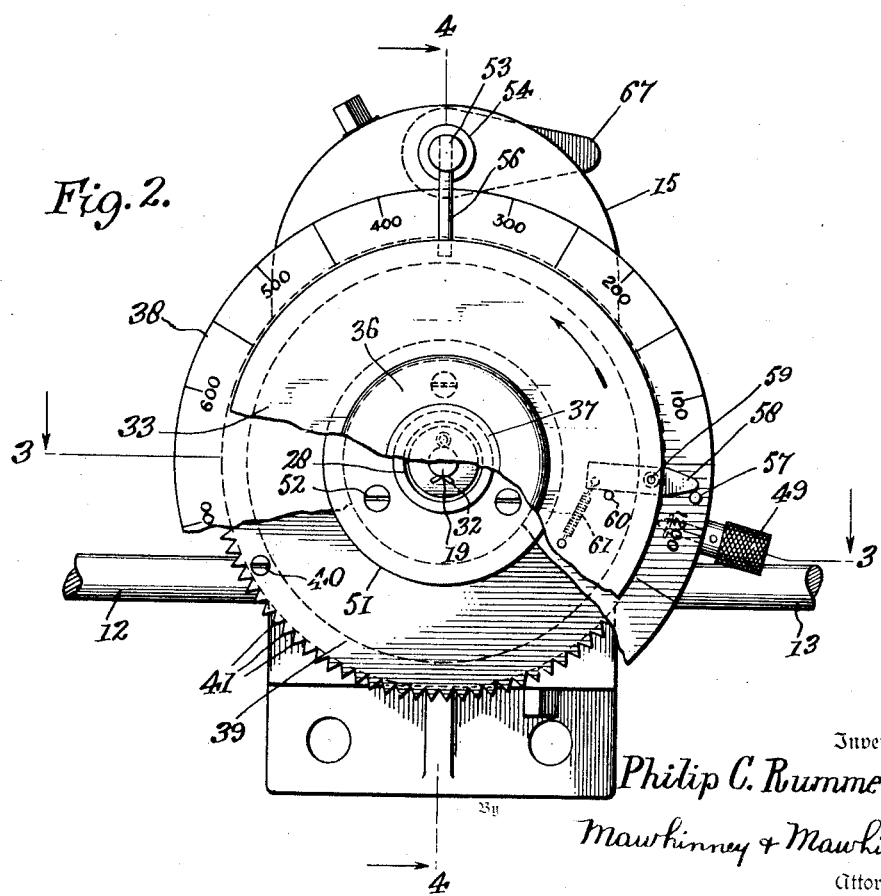
Inventor
Philip C. Rummel, Jr.
Mawhinney & Mawhinney
Attorneys.

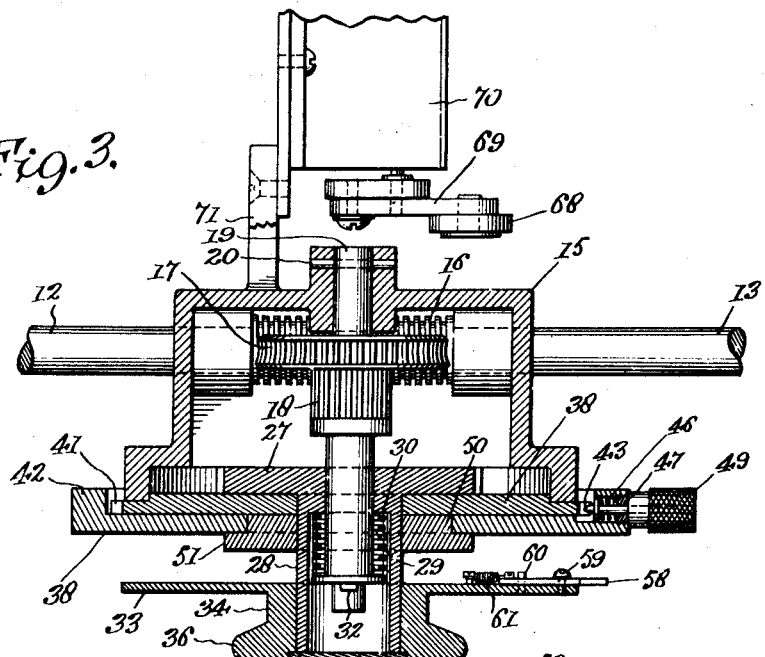

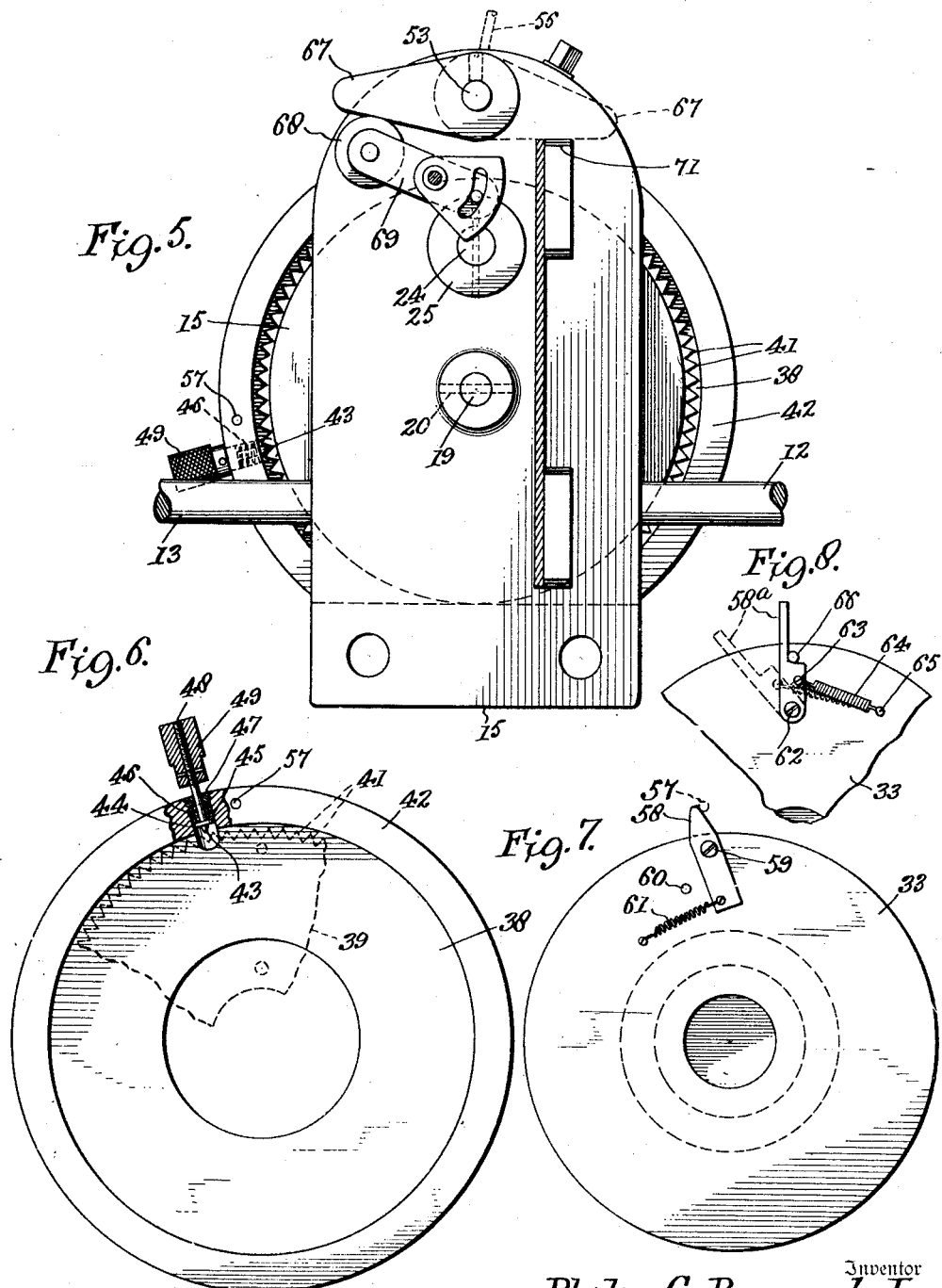

Patented Oct. 6, 1931

1,826,482

UNITED STATES PATENT OFFICE

PHILIP C. RUMMEL, JR., OF GLENSIDE, PENNSYLVANIA

POWER STOP MECHANISM

Application filed April 24, 1929. Serial No. 357,780.

The present invention relates to improvements in power stop mechanism, and has for an object to provide an improved device settable initially to a predetermined position, whereby after a predetermined number of movements of the machine, or a part thereof, have been achieved, the machine will be stopped.

Another object of the invention is to provide an improved power stop mechanism of compact and simple form, which will be readily applicable to various types of machines requiring such stop mechanism, for instance to dough mixing machines, to grinders, cutters, mixers, winding machines, etc.

A further object of the invention is to provide an improved power stop mechanism for use in conjunction with machines such as above outlined for the purpose of securing uniformity in the products of such machines, and whereby labor may be saved and a better supervision had over the operators.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a front elevation of the improved power stop mechanism constructed according to the present invention, and indicated as connected to a machine to be stopped thereby, with the parts of the improved device in the throw-off position.

Figure 2 is a front elevation taken on an enlarged scale and with parts broken away showing the improved device in the operative position.

Figure 3 is a horizontal section taken on the line 3—3 in Figure 2.

Figure 4 is a vertical section taken on the line 4—4 in Figure 2.

Figure 5 is a vertical section taken on the line 5—5 in Figure 4.

Figure 6 is an interior plan view, with parts broken away and parts shown in section of the dial plate.

Figure 7 is an interior plan view of the control disc, and

Figure 8 is a fragmentary interior plan view of the control disc with a slightly modified form of stop dog thereon.

Referring more particularly to the drawings in Figure 1, I show a machine of any type, such for instance as a dough mixing machine having a shaft or stud 10 projecting therefrom and rotating whenever the machine is in operation. A flexible or other coupling is indicated at 11, whereby the stud 10 is coupled to a shaft 12 entering the improved power stop mechanism. A shaft 13 is shown as coming out on the opposite side of the improved power stop mechanism for attachment to a tachometer or other device; or to allow for the mounting of the improved power stop mechanism on the left hand side of the machine. As also shown in Figure 1 a bracket 14 carried by the machine frame may be utilized for supporting the improved power stop mechanism, although it will be obvious that the mechanism may be supported in any appropriate manner.

The shafts 12 and 13 enter the casing 15 of the mechanism and fixedly carry therein a worm 16 disposed in mesh with a worm wheel 17 carrying and rotating therewith a pinion 18. The worm wheel 17 and combined pinion 18 are loosely mounted over a non-rotating or dead shaft 19 secured as by a pin 20 against axial and rotary movement in the casing.

A gear wheel 21 is disposed in mesh with the pinion 18, said gear wheel having a lateral hub 22 secured, as by the set screw 23 to the live or rotary shaft 24, which is mounted in the casing above the dead shaft 19. A collar 25 pinned to the outer end of the live shaft 24 is adapted to hold this shaft against axial movement at one side of the casing rear wall, while a like function is performed by the collar or hub 22 on the inside of the rear wall. A pinion 26 is combined with the gear wheel 21 and is adapted to drive a gear wheel 27, which is freely rotatable and axially slidable on the forward portion of the dead shaft 19. A sleeve 28 is affixed to, or a part of, the axially slidable gear 27 and confined within this sleeve is a coil spring 29 wound in an appropriate number of convolutions about the shaft 19 and abutting at one end against a shoulder 30 of the sleeve and at the other end against a washer 31 held by a cotter pin or key 32 to the shaft 19. The outer end of the sleeve 28 projects through the front portion of the casing 15 and is exposed upon the exterior of the mechanism for manipulation as hereinafter explained. A control or tripping disc 33 is mounted upon the outer end of the sleeve 28. This disc 33 is formed with a hub 34 for receiving a set screw 35 by which the control disc is fixed to the sleeve 28.

A knob 36 on the forward portion of the hub 34 provides for manipulating the control disc 33. A closure and name-plate 37 may be mounted in the outer portion of the knob 36 and against the end of the hollow sleeve 28.

Cooperating with the control disc 33 is a dial plate 38 placed on the exterior of the removable front cover 39 of the casing which is secured to the front wall of the casing as by the use of the screws or other fastenings 40. Peripheral teeth 41 are provided on the cover 39 and over-hanging such teeth is the annular flange 42 extending inwardly from the outer edge of the dial plate 38.

As shown in Figure 6, a spring-pressed pawl or detent is adapted to cooperate with the teeth 41. The detent tooth 43 is carried by the plunger 44 fitted to reciprocate in a radial socket 45 of the rim or flange 42. This socket 45 contains a coil spring 46 enclosed and adjusted as to tension by a threaded plug 47 screwed in the outer end of the socket. The stem 48 of the detent device carries a handle 49 projecting radially from the dial plate, whereby the detent may be withdrawn from engagement with the teeth 41 and the dial plate rotated to a selected angular position.

As shown in Figures 3 and 4 the dial plate 38 rotates about a bearing plate 50 having a flange 51 to confine the dial plate 38 in the bearing and against the cover plate 39. Screws or other fastenings 52 are employed to hold the bearing plate 50 to the cover plate 39.

In the upper portion of the casing is mounted a rock shaft 53 appropriately held against axial movement, as by the collars 54 and 55 and having upon its outer end a pin 56 projecting at substantially right angles to the rock shaft 53 and adapted to enter the space between the control disc 33 and the dial 38.

As shown in Figure 2 the dial plate 38 on its outer face carries a pin 57 adjacent the detent and the edge of the dial plate which is exposed beyond the edge of the smaller control disc 33 is inscribed with a suitable scale. The scale shown is in terms of the number of revolutions of the shaft 12, but it will be obvious that the scale may be in any other terms desired. Cooperating with the pin 57 in the dial plate 38 is a setting dog or pawl 58, shown more particularly in Figures 2 and 7, as being pivotally mounted between its ends upon the combined fulcrum and stop pin 59 carried by the reverse face of the control disc 33. The setting pawl 58 is adapted to be drawn against the stop 60 by a light coil spring 61.

A modification of this construction is shown in Figure 8 in which the setting pawl 58a is pivoted at one end, as indicated at 62, and is connected as indicated at 63 with one end of the coil spring 64 the other end of which is anchored to the control disc 33, as indicated at 65. A stop pin 66 projects out from the rear wall of the disc in position to encounter the setting pawl 58a and hold it in substantially the radial full line position shown in Figure 8.

In the case of Figure 8 the stop pin 66 is long enough to extend into the path of the arm 56. In the case shown in Figure 7, the pivot pin 59 serves a like purpose, it projecting out sufficiently to engage and trip the finger or arm 56.

As shown more particularly in Figure 5 the rear end of the rock shaft 53 is provided with a cam piece or lateral extension 67 adapted to engage a roller 68 mounted on an arm 69 of a controlling mechanism for a switch 70. A stop 71 is mounted upon the switch 70 and supports the cam 67 when moved to the dotted line position, as shown in Figure 5.

In the operation of the device, the parts are shown in Figure 1 as being out of action, the trip finger 56 being raised and the cam 67 thrown back, as indicated in dotted lines in Figure 5 where it is out of engagement with the roller 68 and rests upon a stop 71 provided to retain the parts in the inactive or inoperative position.

In such position of the parts the device will have no effect as a stop mechanism, but the operation of the machine may be continued indefinitely. To set the device, the finger 56 is rotated about to the position indicated in Figure 2, the cam 67 swinging over upon the roller 68, as indicated in Figure 5. The dial is first set using the scale indicated thereon with reference to the trip finger 56 as an origin point. If we wish the machine to operate until its shaft has rotated through say 350 revolutions, the handle 49 is grasped and pulled out radially thus freeing the detent 43 from the teeth 41 of the cover plate 39 and permitting the dial 38 to be rotated in a clockwise direction, as viewed from the front of the mechanism in Figure 2, until the division point on the scale corresponding to 350 is brought opposite the trip finger 56. The detent 43 is then allowed to reengage the fixed teeth 41 to hold the dial in the set position. The control disc 33 is thereupon set. This is accomplished by grasping the knob 36 and initially pulling outwardly upon the same, whereby to shift the parts to the position indicated in Figure 3. The pulling out of the control disc 33 is accompanied by a like movement of the sleeve 28 and connected gear wheel 27, resulting in the compression of the coil spring 29.

Such movement draws the gear wheel 27 out of mesh with the pinion 26 and permits the control disc 33 to be freely rotated about the dial plate 38 without communicating in like movement to the gear train within the casing.

As viewed in Figure 2, the dial plate 33 is rotated in a clockwise direction as far as the same can be rotated, or in other words until the dog 58 or 58ª, as the case may be, abuts against the pin 57 of the dial, whereupon the angular adjustment of the control disc 33 will be arrested. In this position the knob 33 is released, whereupon the coil spring 29 will restore the disc and gear wheel 27 to the inner position, where the gear wheel 27 will reengage its pinion 26, so that the control disc 23 will be rotated through the gear train from the shafts 10 and 12, but in a counterclockwise direction as indicated by the arrow in Figure 2.

When the shafts 10 and 12 have undergone 350 revolutions, the gear ratio is such with reference to the table, as to bring the dog 58 or rather the tripping pin 59, as shown in Figure 7, or 66 as shown in Figure 8, to a position engaging the trip finger 56. The engagement between these two parts will result in a clockwise rotation of the rock shaft 53 as looked at in Figure 2, accompanied by a depressing action of the cam 67 upon the roller 68, thus actuating the switch mechanism 70 to stop the machine.

It will be noted that the cam 67 is exposed so that it may be depressed by hand for an emergency stop. When the parts are as shown in Figure 1 and the device stop is not set, the control disc 33 will, of course, be rotated by the gearing in a counter clockwise direction and this motion will not be interfered with as the dog 58 will swing past the pin 57 in its counter clockwise motion.

In like manner the control disc and dial plate may be set to any predetermined angular position with the result that the shafts 10 and 11 will rotate the selected number of revolutions and the improved power stop mechanism will then arrest the further operation of the machine.

In dough mixers it is very important that the batches of dough be mixed or kneaded for a certain specified time only and that to secure uniformity in the product, the machine must be cut off after a predetermined time and this contingency will be served by the improved power stop mechanism. It will be understood that the device is not only a revolution counter, but it may be also operated by other forms of motion of various mechanical elements. A wide range of count may be provided by varying the ratio of the gearing.

It is obvious that various changes and modifications may be made in the details of construction and design of the above specifically described embodiment of this invention without departing from the spirit thereof, such changes and modifications being restricted only by the scope of the following claims.

What is claimed is:—

1. In an improved power stop mechanism for machines, the combination with a power control for the machine, a rock shaft, a cam on the rock shaft mounted relatively to the power control to stop the machine on movement of the cam in one direction, a trip finger on the rock shaft, a settable dial, and a settable control member concentric with the dial and driven by the machine, cooperating stop means between the dial and control member, and a trip carried by the dial for cooperating with the rock shaft trip.

2. In an improved power stop mechanism for machines, in combination with a power control for the machine, a cam placed relatively to the power control for stopping the machine when moved in one direction, a rock shaft carrying said cam, a trip finger on the rock shaft, a rest for the cam when in inoperative position out of opertive relation to the power control, a settable dial, a settable control member associated with the dial and driven by the machine, cooperating stop means between said dial and control member, and a trip carried by the dial for cooperating with the trip finger on the rock shaft.

3. In a power stop mechanism for machines in combination with a power control for the machine, a trip means for the power control, a dial having independent rotary movement, a ratchet adjacent said dial, a spring pressed detent carried by the dial for engagement with the ratchet to hold the dial in set position, a settable control member concentric with the dial and driven by the machine, cooperating stop means carried by the dial and control member, and trip means carried by the control member for cooperating with said first mentioned trip means.

4. In a power stop mechanism for machines, in combination with a power control for the machine, trip mechanism for operating the power control, a rotary settable dial, a control disc mounted concentrically of said dial and exposing the tabular portion of the dial, cooperating stop means between the dial and said control disc, trip means carried by the disc for engaging said first mentioned trip means, a gear train between said machine and the control disc having disengageable gear elements, one of said gear elements being movable axially with said control disc, and yieldable means for holding the elements in mesh.

5. In a power stop mechanism for machines, in combination with a power control for the machine, trip means for the power control, an angularly settable dial, an angularly settable control disc in front of the dial, cooperating stop means between said dial and disc, trip means carried by the disc for cooperating with the first mentioned trip means, a sleeve to which said dial is affixed, a shaft about which said sleeve is axially slidable, a gear wheel carried by said sleeve, a pinion adapted to mesh in one position with said gear wheel, means whereby said pinion is driven from the machine, and spring means in said sleeve about said shaft for urging the gear wheel into position to engage the pinion.

In testimony whereof I affix my signature.

PHILIP C. RUMMEL, Jr.